(12) United States Patent
Ronen et al.

(10) Patent No.: US 12,328,601 B2
(45) Date of Patent: Jun. 10, 2025

(54) MANAGING ACCESS POINTS OF A CELLULAR NETWORK

(71) Applicant: QGT INTERNATIONAL, INC., San Diego, CA (US)

(72) Inventors: David Ronen, Kfar Saba (IL); Dan Weil, Tel Aviv (IL); Yaniv Vaknin, Tel Aviv (IL)

(73) Assignee: QGT International Inc., San Diego, CA (US)

( * ) Notice: Subject to any disclaimer, the term of this patent is extended or adjusted under 35 U.S.C. 154(b) by 575 days.

(21) Appl. No.: 17/230,448

(22) Filed: Apr. 14, 2021

(65) Prior Publication Data
US 2021/0235287 A1    Jul. 29, 2021

Related U.S. Application Data

(63) Continuation-in-part of application No. PCT/IL2019/051096, filed on Oct. 7, 2019.
(Continued)

(51) Int. Cl.
*H04W 24/02* (2009.01)
*G06N 3/04* (2023.01)
(Continued)

(52) U.S. Cl.
CPC .......... *H04W 24/02* (2013.01); *H04W 24/08* (2013.01); *G06N 3/04* (2013.01); *H04W 84/18* (2013.01)

(58) Field of Classification Search
CPC ..... H04W 24/02; H04W 24/08; H04W 84/18; G06N 3/045; G06N 3/08; G06N 3/04; H04L 41/0823; H04L 41/16; H04L 41/145
See application file for complete search history.

(56) References Cited

U.S. PATENT DOCUMENTS 10,039,016 B1    7/2018 Larish et al.
10,231,140 B2 *  3/2019 Nuss ............... H04W 36/22
(Continued)

FOREIGN PATENT DOCUMENTS

EP       3238389 A1     11/2017
IN     201841014800      5/2018
WO     2018/149898 A2    8/2018

OTHER PUBLICATIONS

Self-Organizing Networks: Self-Planning, Self-Optimization and Self-Healing for GSM, MTS, and LTE, "Self-organizing networks; Chapter 3: Multi-Technology SON; Chapter 5: Multi-Technology Self-Optimization; Chapter 6: Multi-Technology Self-Healing", Oct. 28, 2011, John Wiley & Sons, Ltd. Chichester, UK.
(Continued)

*Primary Examiner* — Oussama Roudani
(74) *Attorney, Agent, or Firm* — Arun Swain

(57) ABSTRACT

There are provided a method and system to control traffic in a cellular network comprising a plurality of access points (APs) serving a plurality of user equipment devices (UEs). The method comprises: using a machine learning (ML) model to classify at least part of the APs in accordance with a first part of AP metrics thereof, thereby giving rise to a plurality of classes, each comprising peering APs; for a given class, processing AP performance metrics of peering APs classified to the given class to identify, among them, one or more first APs with negative performance variations above a variation threshold and, thereby, requiring corrective actions; and enabling one or more corrective actions with regard to the identified one or more first APs.

20 Claims, 14 Drawing Sheets

Related U.S. Application Data

(60) Provisional application No. 62/745,511, filed on Oct. 15, 2018.

(51) Int. Cl.
*H04W 24/08* (2009.01)
*H04W 84/18* (2009.01)

(56) References Cited

U.S. PATENT DOCUMENTS

| | | | | |
|---|---|---|---|---|
| 11,477,666 | B2* | 10/2022 | Kucera | G06N 3/126 |
| 2015/0148040 | A1* | 5/2015 | Ehrlich | H04W 24/02 |
| | | | | 455/436 |
| 2015/0327164 | A1* | 11/2015 | Madan | H04L 43/045 |
| | | | | 370/254 |
| 2016/0112944 | A1* | 4/2016 | Zhou | H04W 36/0072 |
| | | | | 370/338 |
| 2016/0157240 | A1* | 6/2016 | Dribinski | H04W 28/0967 |
| | | | | 370/329 |
| 2016/0198480 | A1* | 7/2016 | Stanwood | H04B 7/0413 |
| | | | | 370/329 |
| 2017/0272319 | A1* | 9/2017 | Sheen | H04W 24/02 |
| 2017/0359752 | A1 | 12/2017 | Yousefi'zadeh et al. | |
| 2018/0019910 | A1 | 1/2018 | Tsagkaris et al. | |
| 2018/0160345 | A1 | 6/2018 | Levinkron et al. | |
| 2018/0206184 | A1* | 7/2018 | Bahr | H04W 48/20 |
| 2018/0249406 | A1 | 8/2018 | Tellado et al. | |
| 2019/0239095 | A1* | 8/2019 | Ouyang | G06N 3/04 |

OTHER PUBLICATIONS

International Search Report and Written Opinion—PCT/IL2019/051096—ISA/EPO—Dec. 18, 2019.

* cited by examiner

MANAGING ACCESS POINTS OF A CELLULAR NETWORK

CROSS-REFERENCE TO RELATED APPLICATIONS

The present application is a Continuation-In-Part of International Application PCT/IL2019/051096, filed on Oct. 7, 2019, which claims the benefit under 35 U.S.C. § 119(e) of U.S. Provisional Patent Application No. 62/745,511, filed Oct. 15, 2018, all of which are herein incorporated by reference in their entirety.

TECHNICAL FIELD

The presently disclosed subject matter relates generally to systems and methods of cellular communication and, in particular, to systems and methods of managing access points of a cellular network.

BACKGROUND

For today's cellular networks, Self-Organizing Network (SON) capabilities have become essential in order to configure, organize, optimise performance and/or provide self-healing if/when faults occur. The major aspects of SON technology are self-configuration, self-healing and self-optimization. Self-configuration enables access points (e.g. macrocells, picocells, femtocells base stations, eNBs, etc. and/or groups thereof) to become "Plug and Play" items. Among the aspects addressed by the self-healing capability are detection of cell degradation and respective self-recovery of software, self-healing of board faults, cell outage recovery, and/or cell outage compensation, etc.

Once the system has been set up, operational characteristics of access points (APs) can be tuned by corrective actions, based on analyses of measurement data, thus enabling achievement of optimal network performance, coverage, and/or capacity by self-optimisation of the network. Self-optimization functions can include, for example, Load Balancing, Handover Optimization, Coverage & Capacity Optimization, Cell Outage Compensation, Energy Saving Management, etc. These optimization functions can change the coverage and capacity of a cell and, possibly, of surrounding cells, by configuring parameters (e.g. transmission power for downlink transmissions, antenna tilt, azimuth parameters, etc.) of the respective access point(s). Optionally, self-optimization functions can be aggregated into use cases (e.g. mobility load balancing (MLB), coverage and capacity optimization (CCO), and mobility robustness optimization (MRO)), which may be independent or may interact since they can operate on common control parameters.

Increasing complexity of cellular networks and service requirements move SON from rule-based to Artificial Intelligence (AI)-based solutions.

The problem of implementing AI solutions (including machine leaning (ML) solutions and, in particular, deep learning (DL) solutions) in SON networks, has been recognized in the conventional art and various techniques have been developed to provide solutions, for example:

International Application No. WO18/149898 discloses methods and systems for network self-optimization using deep learning. A method can include obtaining sets of input data and an objective, the sets of input data including values of wireless network communication parameters, generating sets of output data for the sets of input data in accordance with the objective, generating a mapping of the sets of input data to the sets of output data and training a network controller using the mapping.

Indian Application No. IN2018/41014800 discloses a self-learning system and method in a telecommunication network, particularly for optimized network control. The self-learning system can implement self-learning algorithm that works in coordination with Self-Organized Network (SON). The self-learning system comprises various modules i.e., a map creating module, a training module, a clustering module, a multi-layering module and a predicting module. The algorithm comprises steps that include creating a random neural network map, applying density distribution function on training data, clustering and layering the trained model, testing the model and finally calculating the prediction percentage.

US Patent Application No. US2017/0359752 discloses a technique of congestion reduction of LTE networks using an integrated iterative approach aiming at minimizing the congestion of 4G LTE cellular networks by redistributing traffic from congested cellular towers to non-congested cellular towers.

US Patent Application No. US2018/0019910 discloses a technique of early warning and recommendation system for the proactive management of wireless broadband networks. Without human intervention, the system processes heterogeneous network and non-network data and applies unsupervised machine learning to the data to predict and understand the situations that lead to different network state conditions. More specifically, unsupervised clustering is applied to the data to understand "situations" that can lead to non-normal network state conditions. A deep neural network model of situations is then created to further understand the underlying data relationships between the elements of a situation and network states. The deep neural network model and Reinforcement Learning is used to provide recommendations as to changes in wireless/mobile broadband network configuration parameters that will improve the state of a predicted situation associated with non-normal network conditions. The system displays warnings and corresponding recommendations regarding predicted non-normal network conditions in a user interface for a network operator.

US Patent Application No. US2018/0160345 discloses a technique of overshooting cell detection. A system can include: an input/output (I/O) module operative to receive operational data for features associated with at least inter-cell performance in a mobile network, processing circuitry, a model generator application to be executed by the processing circuitry and operative to: use at least one prediction model to analyze training sets comprising examples of values for the features for at least overshooting cells, and to generate a scoring model for detection of the overshooting cells from among cells in the mobile network, and a boomer detection application to be executed by the processing circuitry and operative to: use the scoring model with the operational data to detect the overshooting cells from among cells in a mobile network, and reduce interference by the overshooting cells.

U.S. Pat. No. 10,039,016 discloses a technique of machine-learning-based RF optimization. The method, performed by a network device, includes identifying a target cluster of cell towers for a radio access network (RAN); generating a model for collecting RAN measurements from mobile communication devices in the target cluster; and sending the model via a structured reference point to client applications on the mobile communication devices. The model may direct collection of and sending of the RAN measurements by the client applications. The method may further include receiving, via the structured reference point, the RAN measurements from the client applications based on the model; and aggregating the RAN measurements to represent aspects of the target cluster based on the model.

The references cited above teach background information that may be applicable to the presently disclosed subject matter. Therefore, the full contents of these publications are incorporated by reference herein where appropriate for appropriate teachings of additional or alternative details, features and/or technical background.

GENERAL DESCRIPTION

In accordance with certain aspects of the presently disclosed subject matter, there is provided a method of controlling traffic in a cellular network comprising a plurality of access points (APs) serving a plurality of user equipment devices (UEs). The method comprises: a) using, by a computer system, a machine learning (MHL) model to classify at least part of the APs in accordance with a first part of AP metrics thereof, thereby giving rise to a plurality of classes, each comprising peering APs; b) for a given class, processing, by the computer system, AP performance metrics of peering APs classified to the given class to identify, among them, one or more first APs with negative performance variations above a variation threshold and, thereby, requiring corrective actions; and c) enabling, by the computerized system, one or more corrective actions with regard to the identified one or more first APs. Optionally, the AP performance metrics do not belong to the first part of AP metrics. Optionally, the operations b) and c) can be provided continuously. In certain embodiments, the operation a) can be provided continuously. Optionally, the performance variations to be identified and AP performance metrics usable therefor can customized for each given class.

In accordance with further aspects of the presently disclosed subject matter, the method can further comprise defining by the computer system class-based AP performance metrics of the given class in accordance with AP performance metrics of the rest of peering APs classified thereto, and defining the one or more corrective actions in accordance with the defined class-based AP performance metrics.

In accordance with further aspects of the presently disclosed subject matter, the method can further comprise defining by the computer system class-based configuration of the given class, the configuration corresponding to the rest of the peering APs classified thereto, wherein the one or more corrective actions comprise aligning configuration of the identified one or more first APs with the defined class-based configuration. The method can further comprise: for the given class, identifying among the peering APs one or more second APs with positive performance variations above a variation threshold; and optimizing class-based configuration of the peering APs in accordance with configuration corresponding to the identified one or more second APs.

In accordance with further aspects of the presently disclosed subject matter, the method can further comprise for the given class, identifying among the peering APs one or more second APs with positive performance variations above a variation threshold; and aligning configuration of the rest of the peering APs in accordance with configuration corresponding to the identified one or more second APs.

In accordance with other aspects of the presently disclosed subject matter, there is provided a method of controlling traffic in a cellular network comprising a plurality of access points (APs) serving a plurality of user equipment devices (UEs), the method comprising: using, by a computer system, a machine learning (ML) model to identify APs belonging to a given class, thereby giving rise to a plurality of peering APs; defining, by the computer system, class-based configuration in accordance with AP metrics of APs classified to the given class; and enabling, by the computer system, applying the defined class-based configuration to all APs in the plurality of peering APs.

In accordance with other aspects of the presently disclosed subject matter, there is provided a computerized system to control traffic in a cellular network comprising a plurality of access points (APs) serving a plurality of user equipment devices (UEs), the system comprising a processing and memory circuitry (PMC) configured to operate in accordance with the methods detailed above.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "enabling", "collecting", "applying", "classifying", "obtaining", "identifying" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the SON system, Network Information (NI) Module and Processing and Memory Circuitry (PMC) disclosed in the present application.

It is to be understood that the term "non-transitory" is used herein to exclude transitory, propagating signals, but to include, otherwise, any volatile or non-volatile computer memory technology suitable to the presently disclosed subject matter.

The operations in accordance with the teachings herein may be performed by a computer specially constructed for the desired purposes or by a general-purpose computer specially configured for the desired purpose by a computer program stored in a computer readable storage medium.

Figure 1A:
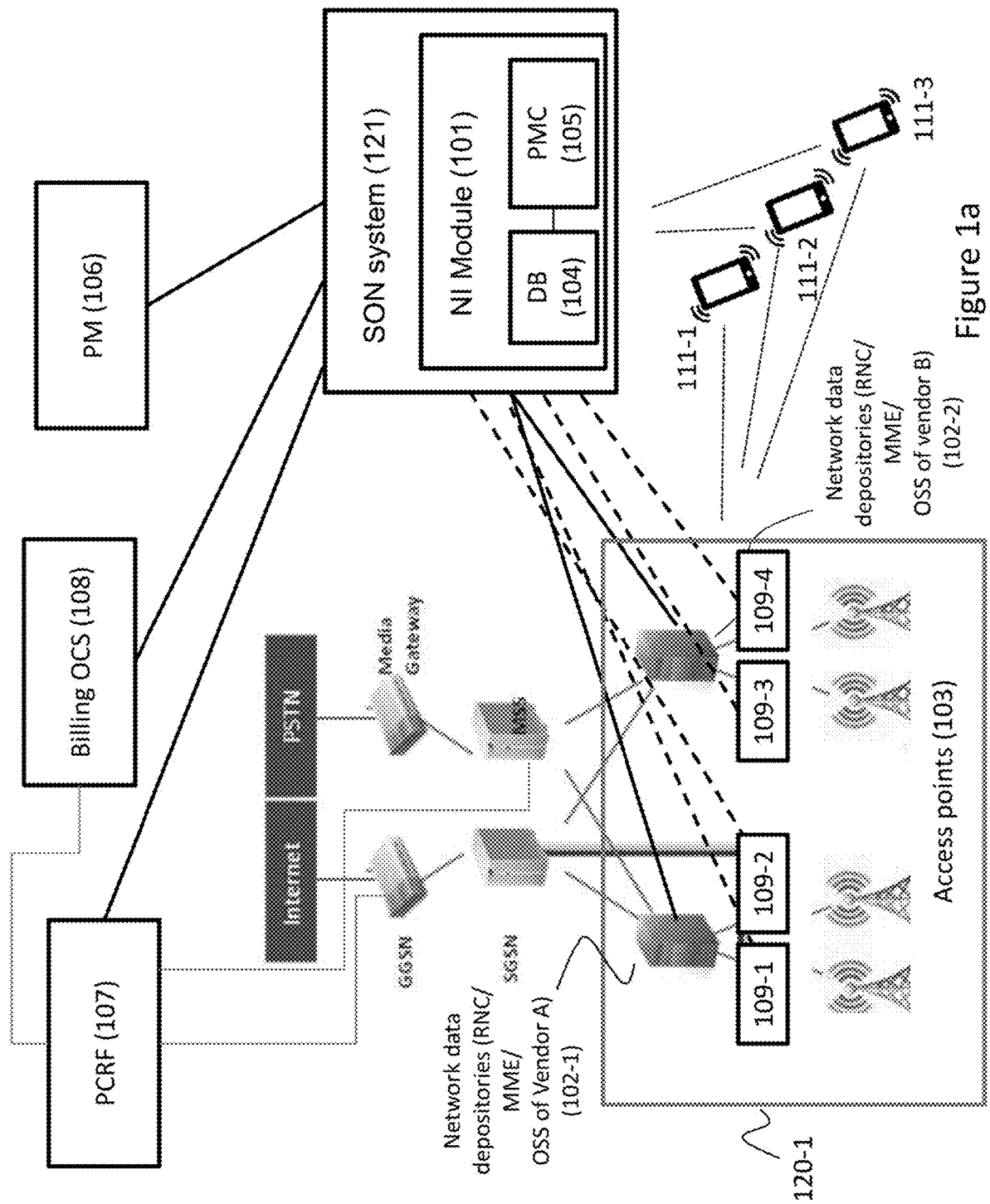
FIGS. 1a-1b illustrate exemplified generalized cellular network environments including a SON system configured in accordance with certain embodiments of the presently disclosed subject matter.
Figure 1B:
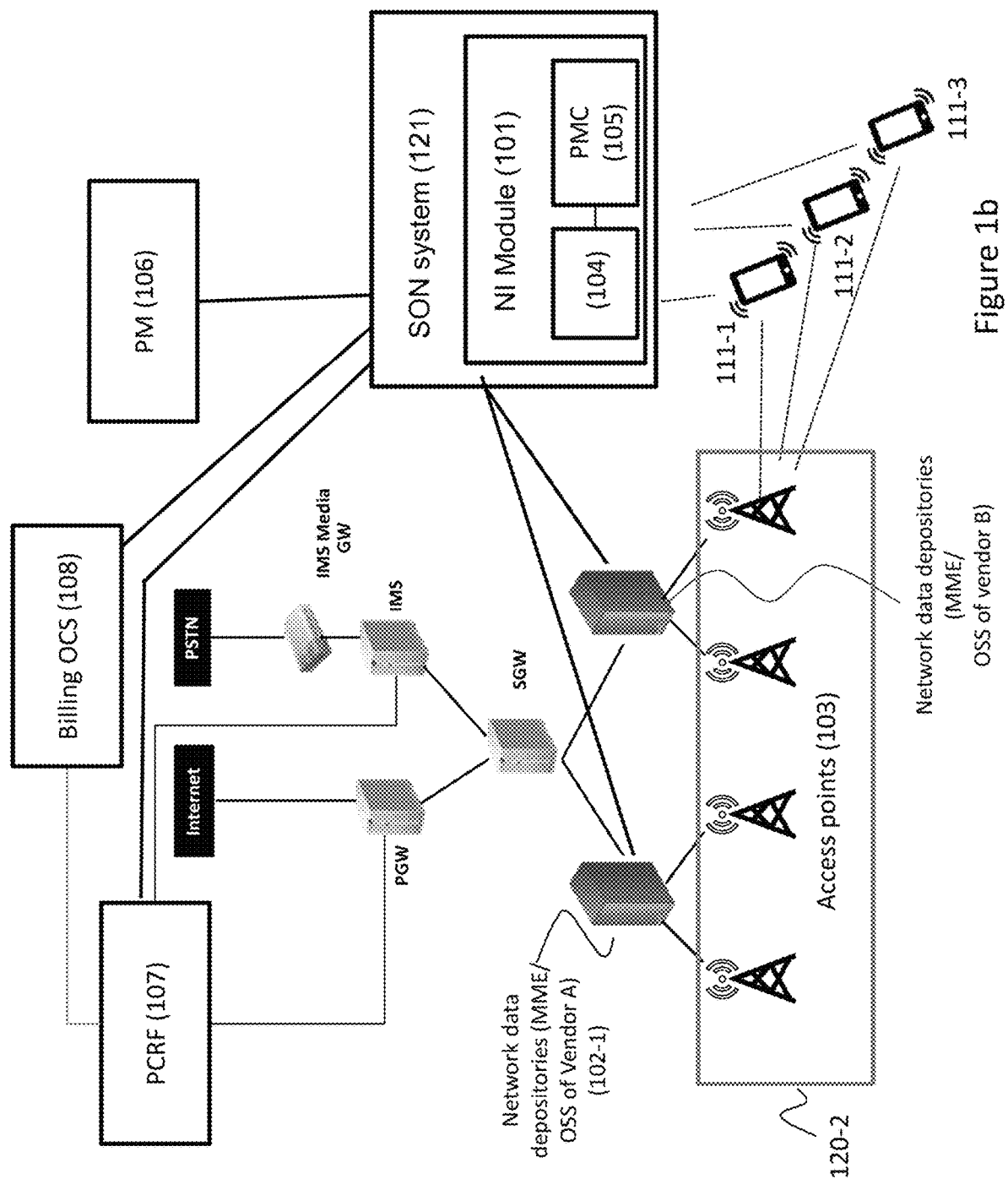

Bearing this in mind, attention is drawn to FIG. 1a and FIG. 1b illustrating non-limiting examples of a cellular network environment including a SON system 121 configured in accordance with certain embodiments of the presently disclosed subject matter. FIG. 1a illustrates a generalized 3G network environment, and FIG. 1b illustrates a generalized environment of LTE or 5G cellular networks. The exemplified network environments illustrated in FIGS. 1a and 1b comprise a radio access network (RAN) denoted 120-1 for 3G network in FIG. 1a and 120-2 for LTE network in FIG. 1b. RAN comprises a plurality of access points operating in accordance with cellular standards (e.g. macrocells, picocells, femtocells base stations, eNBs, etc. and/or groups thereof) denoted as 103-1-103-4. The access points can operate in different bands and/or RATs (Radio Access Technologies) and can be provided by different vendors. The access points (APs) serve a multiplicity of user equipment devices (UEs) being in operating or in idle modes. The UEs are configured to communicate with APs via radio frequency (RF) channels allowing bidirectional transmission of voice and/or data between the APs and UEs in accordance with respective cellular standards.

SON system 121 can be connected (by direct connection or through a mediation layer as, for example, an OSS server) to access points 103 (connections not shown for simplicity of illustration). The SON system can be configured to enable corrective actions (e.g. self-configuring, self-optimizing and/or self-healing, etc.) with regard to one or more access points in accordance with data related to the network environment and obtained by the SON system. As will be further detailed with reference to FIG. 2, SON system 121 can comprise a Network Information (NI) Module 101 configured to collect and process data related to the Access Points. NI module 101 comprises a memory 104 operatively coupled to a processor and memory circuitry (PMC) 105 configured to enable operations as detailed with reference to FIGS. 2-8. PMC 105 comprises a processor (not shown separately) operatively coupled to a memory (not shown separately). Memory 104 is configured to accommodate a database configured to store the collected data and the results of processing thereof.

Network Information (NI) module 101 is operatively connected to one or more network depositories denoted as 102-1 and 102-2. Optionally, some of the network depositories can be provided by different vendors. Unless specifically stated otherwise, any depository of data received from the plurality of APs (directly, via probe devices and/or otherwise) is referred to hereinafter as a network data (ND) depository. By way of non-limiting example, in a 3G environment such depositories can be located at Radio Network Controller(s) (RNC), OSS (Operation and Support System) servers, etc. By way of another non-limiting example, in LTE environment such depositories can be located at OSS servers and/or at MME. The NI module (101) can be further operatively connected to a Performance Management (PM) node (106) and, optionally, to a Policy and Charging Rules Function (PCRF) node (107), billing system (108) and/or other client-related system.

The NI module is configured to continuously obtain data informative of performance metrics (e.g. KPIs) related to each given Access Point (AP). Likewise, the NI module is configured to obtain data informative of demand/traffic, configuration and physical attributes of respective APs.

By way of non-limiting example, performance metrics can be obtained by processing RAN-related data continuously collected from one or more ND depositories and/or from a plurality of probe devices (denoted as 109-1-109-4 in FIG. 1a (and are not shown in FIG. 1b for simplicity of illustration) and/or directly from the plurality of access points.

Alternatively or additionally, at least part of the data informative of performance metrics (e.g. KPIs), configuration and physical attributes, can be received by the NI module from network entities (e.g. PM node 106).

Alternatively or additionally, performance metrics can be obtained by processing RAN-related and context-related data obtained from a plurality of UEs (denoted as 111-1-111-3). By way of non-limiting example, context related data can be obtained using various sensors of the UE and/or applications running on UE, and can include UE location, battery level threshold, battery charge rate of change, predicted location of UE based on UE mobility and/or UE calendar information, calendar information, alarm information, application data from an application running on the UE, type of UE (e.g. smartphone, IoT item, etc.), name of mobile operator, environment-related status (e.g. indoor, outdoor, driving, walking, etc.), etc.

Unless specifically stated otherwise, it is appreciated that throughout the specification the terms "continuously collecting data by the SON system" or the like refer to receiving (in push or pull mode) data substantially each time new data is available to the SON system. For example, in "push" mode, the availability of new data in the system can be defined by a period specified as collection time and/or reporting time for a given ND depository, UE, etc., by availability of connection with a given UE, by predefined "push" events, etc. In "pull" mode, the availability of new data can be defined by configuration of the NI module specifying when to pull the data. Likewise, the terms "continuously obtaining", "continuously reporting", "continuously generating", "continuously providing" and the like, refer to actions (of NI module, SON system or UE) provided in accordance with a certain arrangement related to new data availability in near real-time mode, and/or responsive to predefined events, etc. It is noted that, unless specifically stated otherwise, the term "predefined events" should be expansively construed to cover also scheduled events and/or events occurring in accordance with predefined periodicity.

NI module 101 can be configured to store the data informative of performance metrics (e.g. KPIs), configuration and physical attributes of APs in the database accommodated in memory 104.

Those versed in the art will readily appreciate that the teachings of the presently disclosed subject matter are not bound by the network environments illustrated in FIGS. 1a and 1b, and can be implemented in other network architectures and/or standards.

Figure 2:
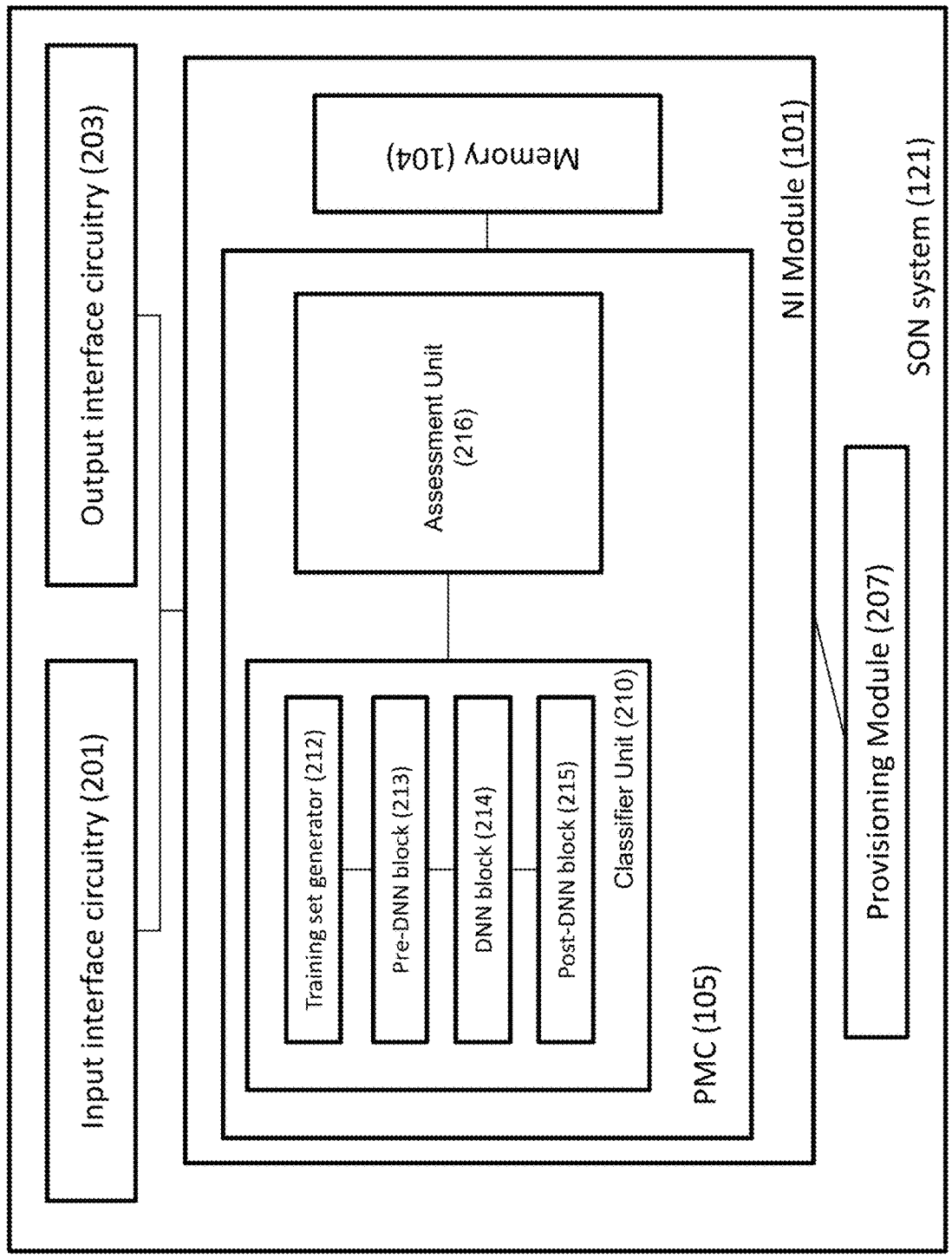
FIG. 2 illustrates a generalized block diagram of the SON system in accordance with certain embodiments of the presently disclosed subject matter.

Referring to FIG. 2, there is illustrated a generalized block diagram of SON system 121 in accordance with certain embodiments of the presently disclosed subject matter. The SON system comprises NI module 101 operatively coupled to input interface circuitry 201 (e.g. one or more ports), output interface circuitry 203 (e.g. one or more ports) and provisioning module 207. The SON system can further comprise a graphical user interface (not shown) enabling user-specified inputs related to its operation.

Input interface circuitry 201 is configured to enable bidirectional data communication necessary for continuously receiving data informative of performance, configuration and/or physical attributes of APs. Input interface circuitry 201 provides the received data and/or derivatives thereof to NI module 101 which comprises PMC 105 and memory 104 operatively coupled to the PMC. PMC 105 is configured to provide the necessary processing of the received and/or stored data in accordance with the operations further detailed with reference to FIGS. 3-7.

As will be further detailed with reference to FIGS. 3-7, NI module is configured to receive, via input interface 201, data informative of performance metrics (e.g. KPIs), configuration, demand/traffic and/or physical attributes related to Access Points (APs). Upon processing the received data (optionally together with other data as, for example, data informative of service-related policies, network context, etc.), NI module can send the results to provisioning module 207 and enable corrective actions accordingly.

Computer-based provisioning module 207 is configured to generate provisioning scripts (or select pre-provisioned scripts) in accordance with inputs received from the processing module 205, and to enable respective corrective actions (e.g. using OSS SBI and/or other network-provided APIs/SBIs, including changes therein). Output interface circuitry 203 is configured to forward the results of the processing and/or the generated/selected provisioning scripts to respective network entities.

The processor of PMC 105 can be configured to execute several functional elements in accordance with computer-readable instructions implemented on a non-transitory computer-readable memory comprised in PMC 105. Such functional elements are referred to hereinafter as comprised in the PMC 105.

Functional elements comprised in PMC 105 include operatively connected classifier unit 210 and assessment unit 216. Operation of PMC 105 and the functional blocks therein will be further detailed with reference to FIGS. 3-7. It is noted that, optionally, PMC 105 can be shared with and/or incorporated in other modules in the SON system.

As will be further detailed with reference to FIGS. 3-7, upon training, classifier unit 210 is configured to automatically classify APs into a plurality of classes using data informative of performance metrics (e.g. KPIs), demand/traffic, configuration and/or physical attributes of respective APs (such data and/or parts thereof are collectively referred to hereinafter as AP metrics). Assessment unit 216 is configured to define, for a given AP, whether, and which corrective actions are required in accordance with the obtained AP classification, AP metrics of the given AP, and AP metrics corresponding to the respective class (class-based AP metrics). Optionally, assessment unit 216 can be configured to analyse performance metrics of APs in a given class and generate AP performance metrics corresponding to the given class (class-based AP metrics). Alternatively or additionally, assessment unit 216 can be further configured to reveal, within the given class, APs with performance variations exceeding a predefined variation threshold.

For purpose of illustration only, the following description of NI module 101 is provided for an embodiment implementing Deep Neural Network (DNN) for supervised classification into predefined classes. Those skilled in the art will readily appreciate that the teachings of the presently disclosed subject matter are, likewise, applicable to classifiers using other machine learning models (e.g. other generative models including non-linear networks, multiclass support vector machine (SVM), random forest classification engines, etc.) suitable for AP classification based on AP metrics. The teachings of the presently disclosed subject matter are also applicable to unsupervised learning with learning and labelling the classes upon clustering. Likewise, suitable machine learning models can be implemented for generating class-based AP metrics and/or revealing APs with inter-class performance variations.

By way of non-limiting example, classifier unit 210 can comprise training set generator 212 and DNN block 214 configured to enable processing APs-related data using Deep Neural Network(s). Optionally, classifier unit 210 can further comprise pre-DNN block 213 configured to provide pre-processing before forwarding input data to DNN block 214 and/or post-DNN block 115 configured to provide post-processing data generated by DNN block 214.

DNN block 214 can comprise at least one DNN network comprising a plurality of layers organized in accordance with respective DNN architecture. By way of non-limiting example, the layers in the DNN network can be organized in accordance with Convolutional Neural Network (CNN) architecture, Recurrent Neural Network architecture, Recursive Neural Networks architecture, or otherwise.

Each layer of DNN block 214 can include multiple basic computational elements (CE) typically referred to in the art as dimensions, neurons, or nodes. Computational elements of a given layer can be connected with CEs of a preceding layer and/or a subsequent layer. Each connection between CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function, or another suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of a deep neural network can be initially selected prior to training, and can be further iteratively adjusted or modified during training to achieve an optimal set of weighting and/or threshold values in the trained DNN block. After each iteration, a difference can be determined between the actual output produced by DNN block and the target output associated with the respective training set of data. The difference can be referred to as an error value. Training can be determined to be complete when a cost function indicative of the error value is less than a predetermined value, or when a limited change in performance between iterations is achieved.

A set of DNN input data used to adjust the weights/thresholds of the deep neural network is referred to hereinafter as a training set. The training set can be generated by training set generator 212 and/or received via input interface 201.

Inputs to classifier unit 210 can be pre-processed by pre-DNN block 213 prior to inputting to DNN block 214, and/or outputs of DNN block 214 can be post-processed by post-DNN block 215 before outputting from DNN 212. In such cases, training of classifier unit 210 can further include determining parameters of the pre-DNN block and/or post-DNN block. Optionally, the DNN block can be trained so as to minimize cost function of the DNN, while parameters of the pre-DNN block e and/or post-DNN block can be pre-defined and/or adjusted during the training. A set of training-based parameters can further include parameters related to pre-DNN and post-DNN processing.

It is noted that the teachings of the presently disclosed subject matter are not bound by the architecture of the DNN network.

Those skilled in the art will readily appreciate that the presently disclosed subject matter is not bound by SON system illustrated in FIG. 2; equivalent and/or modified functionality can be consolidated or divided in another manner and can be implemented in any appropriate combination of software with firmware and hardware. In some embodiments, NI module 101 can be implemented as one or more standalone entities operating in conjunction with the SON system, or can be integrated, fully or partly, with other network entities (e.g. OSS, etc.). The SON system can be implemented in a distributed computing environment. Optionally, at least part of the functionality of NI module 101 and/or provisioning module 207 can be implemented in a cloud and/or distributed arrangement.

Figure 3:
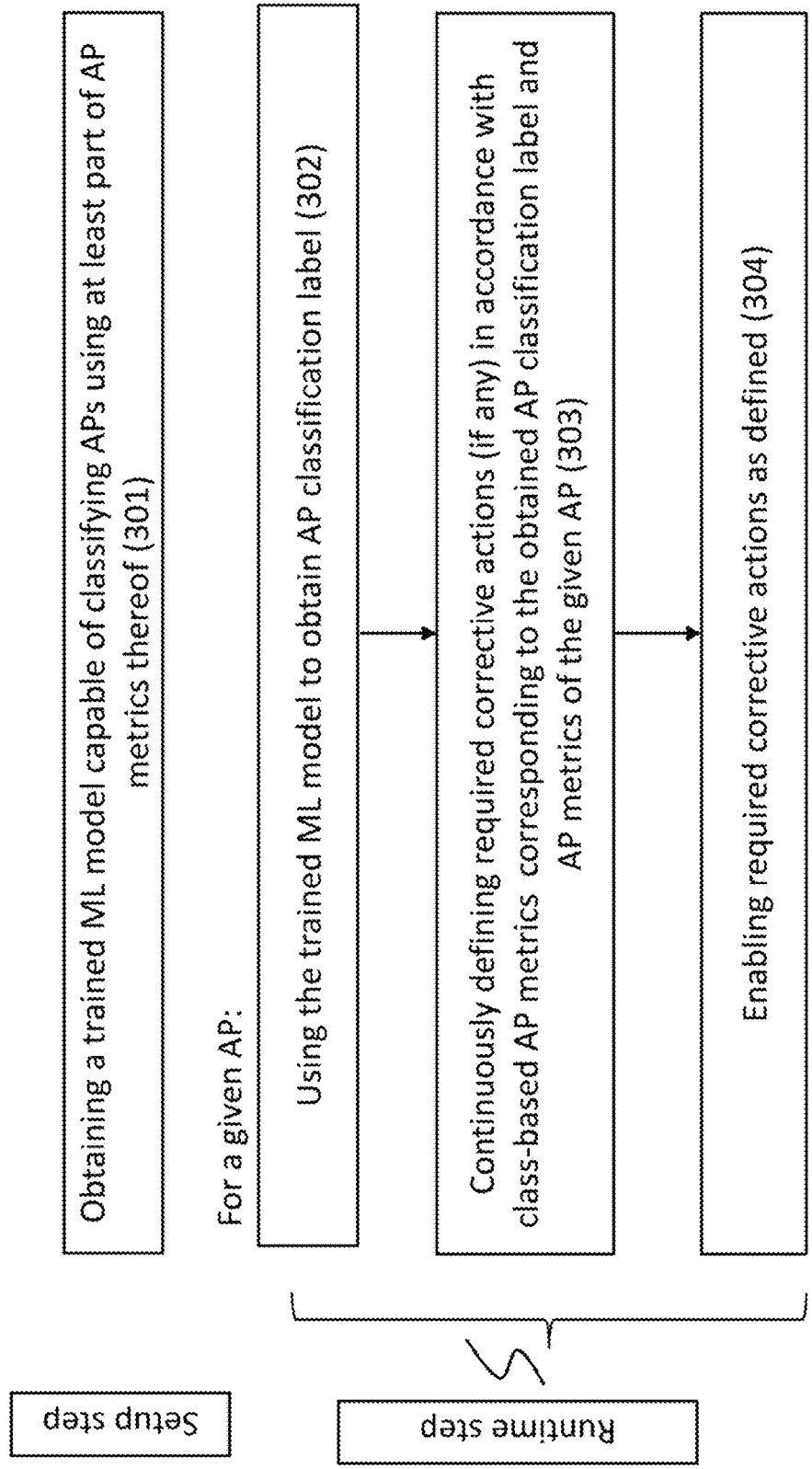
FIG. 3 illustrates a generalized flow diagram of operating the SON system in accordance with certain embodiments of the presently disclosed subject matter.

Referring to FIG. 3, there is illustrated a generalized flow chart of operating the SON system in accordance with certain embodiments of the presently disclosed subject matter. Operating SON system 121 includes training (301), during setup time, a machine learning (ML) model (e.g. DNN network, SVM classifier, etc.). ML model can be trained to classify APs using at least part of the AP metrics thereof. By way of non-limiting example, in a case of a DNN ML model, training can include: obtaining training data informative of performance metrics, configuration and/or physical attributes of APs included in training a plurality of APs, obtaining ground truth data informative of classification labels of respective APs, and using the received data for ML model training. Optionally, the same or a separate ML model (not shown in FIG. 2) can be trained to generate class-based AP metrics and/or class-based configuration in accordance with the AP metrics of APs belonging to the respective class.

Further, during runtime, the SON system (e.g. NI module) uses the trained ML model(s) to obtain (302) (optionally, continuously) a classification label (e.g. highway facing APs, border APs, train station APs, etc.) of a given AP by processing, at least part of its AP metrics (e.g. performance metrics and/or configuration metrics and/or physical metrics). Further, the SON system (e.g. NI module) defines (303) (optionally, continuously—e.g. every 15 minutes) required corrective actions (if any) in accordance with class-based AP metrics corresponding to the obtained AP classification label and AP metrics of the given AP. Further, the SON system enables (305) providing corrective actions (including configuration updates) as defined. It is noted that, as specified with reference to FIG. 2, continuously provided actions can include actions provided in near real-time mode, provided responsive to predefined events (including scheduled events and/or events occurring in accordance with predefined periodicity), etc.

Figure 4:
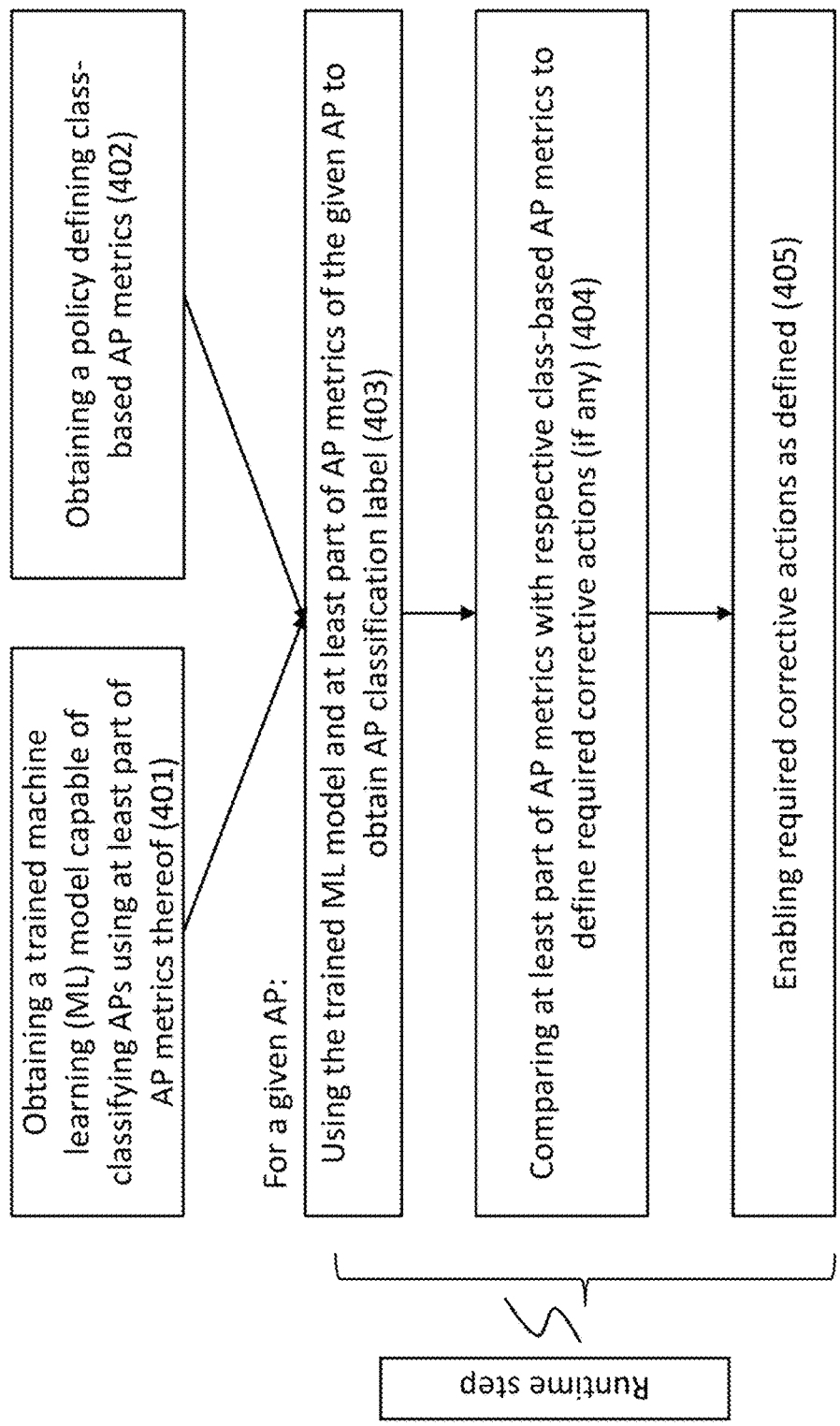
FIG. 4 illustrates a generalized flow diagram of operating the SON system in accordance with certain embodiments of the presently disclosed subject matter when class-based AP metrics are defined by a policy.

Referring to FIG. 4, there is illustrated the above operation of the SON system when class-based AP metrics are specified by a policy. Upon obtaining (401) a trained machine learning (ML) model capable of classifying APs using at least part of the AP metrics thereof, the SON system uses the trained ML model and at least part of AP metrics of a given AP to obtain (403) AP classification label of the given AP. The SON system compares at least part of the AP metrics of the given AP with respective class-based AP metrics specified by the obtained (402) policy to define (404) required corrective actions (if any), and enables (405) the required corrective actions. Optionally, further to the class-based AP metrics, the policy can specify the rules of applying corrective actions in accordance with discrepancy between the class-based AP metrics and the metrics of a given AP. It is noted that the policy specifies the class-based AP metrics and rules in accordance with classes, and the same class-based AP metrics and rules are applicable to all APs with the same classification labels.

Alternatively or additionally, the SON system can analyse AP metrics of a plurality of APs belonging to the same class (i.e. associated with the same classification label) to reveal APs with inter-class performance variations above a variation threshold (referred to hereinafter as "performance anomalies" or "anomalies"). As illustrated with reference to FIG. 5, the SON system uses the trained ML model to identify (502) a plurality of APs belonging to the same class (referred to hereinafter as peers), and analyses AP metrics characterizing APs of the same class. Based on the analyses, the SON system can identify (503) positive or negative anomalies.

Figure 5:
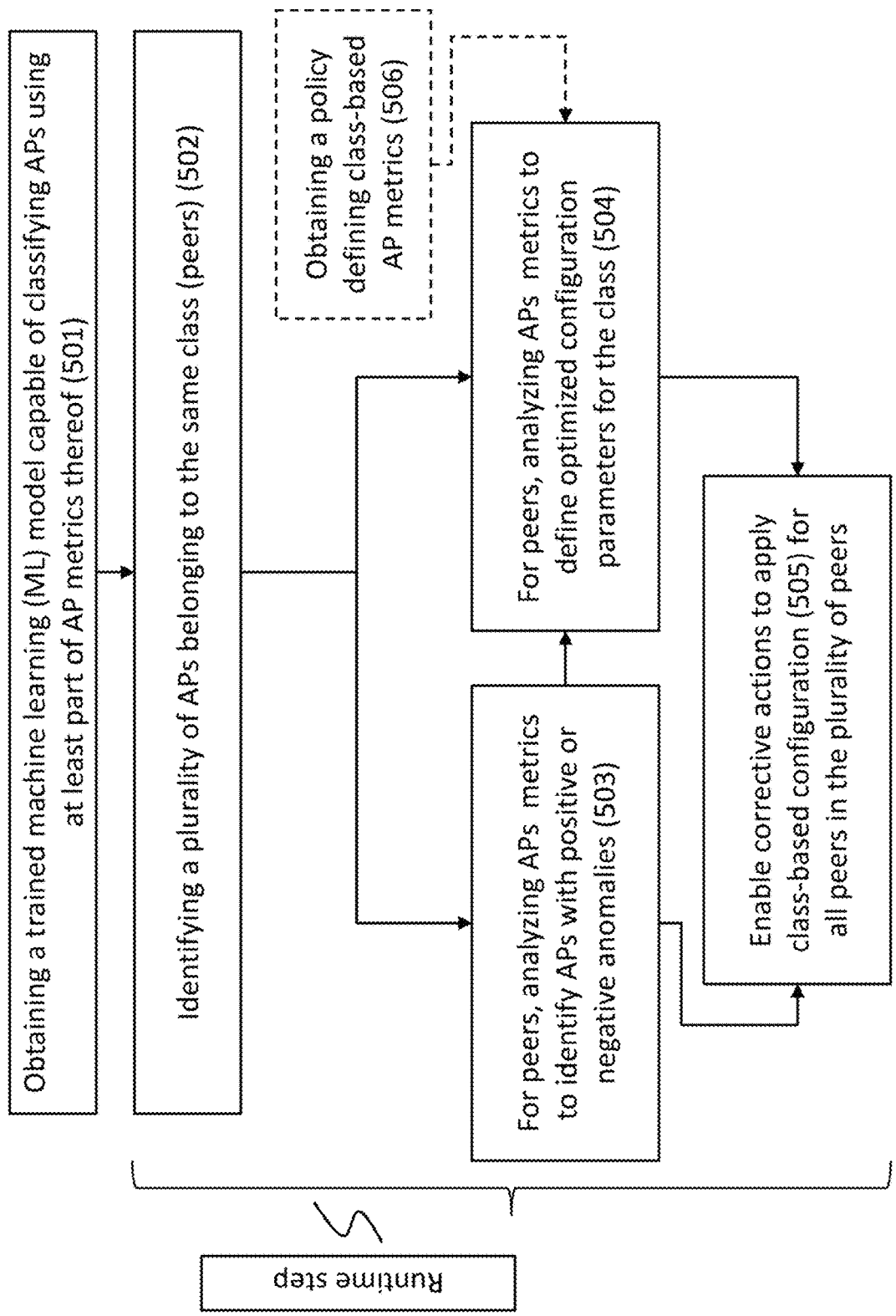
FIG. 5 illustrates a generalized flow diagram of operating the SON system in accordance with certain embodiments of the presently disclosed subject matter when class-based AP metrics are defined using AP metrics of a plurality of APs belonging to the same class.

It is noted that in the processes illustrated with reference to FIGS. 3-5, classifying APs can be provided into predefined classes based on a supervised machine learning, or can be provided with the help of unsupervised learning with further labelling the unknown classes.

In certain embodiments, classes can be defined by clustering APs in accordance with a combination of labels informative of different types of features, for example features informative of environment, traffic, mobility, RF condition, etc. For example, VoLTE cluster can be defined using the combination of the following features: HW Cells+Suburban+High Mobility+QCI1. Non-limiting examples of the types of the features and respective labels are illustrated in Table 1.

TABLE 1

Non-limiting examples of the types of classification features and classification labels therein.

| Type of features | Classification Labels |
| --- | --- |
| Environment | Site density, UE density, measured cell radius, Residential/commercial, indoor/outdoor, Highway/Tunnel, Border cell, Terrain-type |
| Traffic | Data/Voice, BH DL load, BH UL load, QCI distribution, Control channels performance |

TABLE 1-continued

Non-limiting examples of the types of classification features and classification labels therein.

| Type of features | Classification Labels |
| --- | --- |
| Mobility | HO per user, intra/inter HO ratio, Is-Highway |
| RF conditions | DL interference level, UL interference level, Coverage overlap from other cells |
| Augmented KPI | X % worse cell (Spectral Efficiency) |

Revealing APs with inter-class anomalies can be provided with the help of further clustering the peering APs in accordance with their performance metrics. Anomalies to be revealed and respective performance metrics can be customized for each given class. The variation threshold can be defined by a policy rules (e.g. as a predefined % of a over-class mean value of a respective parameter(s)) and/or dynamically calculated by the SON system during clustering. Non-limiting examples of the class-customized performance variations and performance metric usable for revealing thereof are detailed in Table 2.

TABLE 2

Non-limiting examples of the usable class-customized performance metric for different classes.

| Name of Class | Performance variation within the class | Usable performance metric |
| --- | --- | --- |
| DENSITY | Different cell radius within cell | KPI indicative of Timing Advance |
| APs serving Highway | Handover Cell admission control Handover per user | InterFreqHoOUT-Intra-Frequency Handover Out InterFreqHoOUT-Inter-Frequency Handover Out Avg_user-Average User Number |
| Border Aps | Cell coverage Drop call rate Handover to other standard | Access Failure Rate Unavail_SR; Radio Network Unavailability Rate IRATHO (HO based to WCDMA attempts, HO based to GSM attempts) |
| Capacity Aps | Cell average throughput User average throughput Traffic load utilization Drop call rate | PRB_DL_Used_Avg PRB_UL_Used_Avg Downlink Traffic Volume Avg_user-Average User Number |
| Coverage Aps | Cell interference Cell access | Avg_user-Average User Number Timing Advance Downlink Traffic Volume |

It is noted that in certain embodiments the performance metrics usable for AP classification can differ from performance metrics usable for revealing the performance anomalies.

Based on peers' AP metrics analyses (and, optionally, a policy (506) defining some of class-based AP metrics), the SON system can define (504) configuration parameters for the APs of a certain class as a class-based configuration, and enable corrective actions to apply (505) class-based configuration for all peers in the identified plurality of peers. By way of non-limiting example, class-based configuration can be defined as a "mean" configuration of a plurality of non-anomaly peering Aps.

Upon identification of one or more anomaly APs (i.e. cells and/or sites that are functioning below respective peers and their performance variation is above the variation threshold), SON system can apply corrective actions to align (505) the configurations of such identified anomaly APs with class-based configuration corresponding to the rest of the peers. Likewise, the SON system can identify one or more APs that are functioning better than their peers, provide "root-cause analyses" of such anomaly, and, when applicable, define the class-based configuration in accordance with such AP(s) configuration and apply respective corrective actions to all other peers so to improve the rest of the peers accordingly.

Thus, in accordance with certain embodiments of the presently disclosed subject matter, the SON system provides automatic clustering of APs belonging to the same class (e.g. highway facing APs, border APs, train station APs, etc.). The SON system can use such clusters for AP configuration, auto-tuning of AP parameters, anomaly detection, auto-calibration of SON profiles, etc. Among advantages of such embodiments are engineering efficiency, consistency across the network, hyper-automation of RAN configuration, etc. Continuous AP clustering can further identify behaviour changes of certain APs, thus requiring their re-classification.

Figure 6:
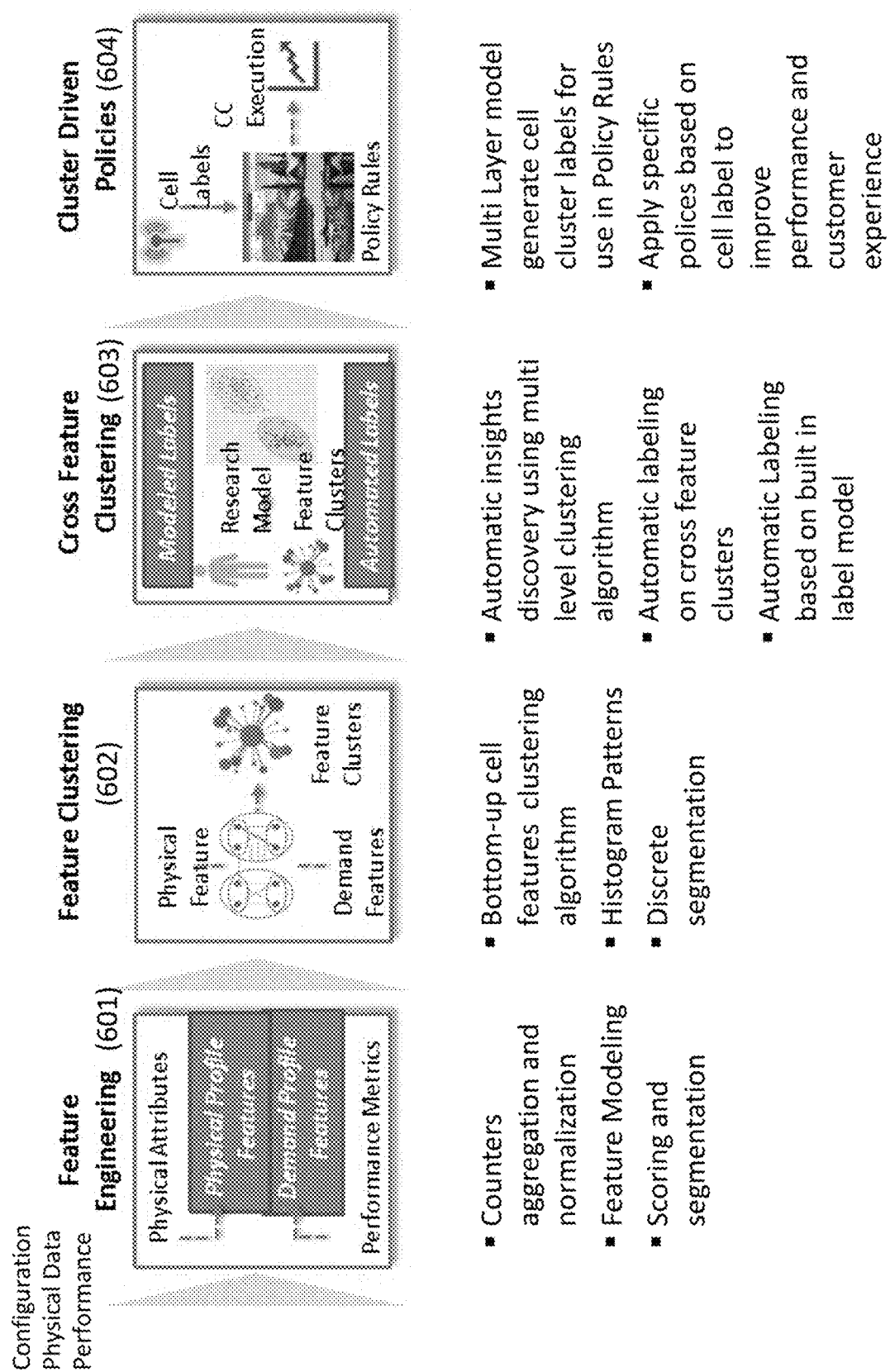
FIG. 6 illustrates a generalized diagram of clustering APs as belonging to the same class.

FIG. 6 further details the operation of a SON system illustrated with reference to FIG. 5. NI module processes obtained data informative of performance metrics, demand/traffic, configuration and physical attributes to provide feature engineering (601), thereby extracting physical profile features and demand profile features. Feature engineering can include counter aggregation and normalization, feature modelling, scoring and segmentation, etc. By way of non-limiting example, physical profile features can include density score, cell height, CQI, band, cell type, frequency, etc. By way of another non-limiting example, demand profile features can include time advance, RRC users, mobility score, CA users, PRB utilization, QCI, payload, interference, etc. NI module further provides feature clustering (602) (e.g. using a bottom-up clustering algorithm). Feature clustering can be provided separately for physical profile features and demand profile features. The NI module further processes the obtained feature clusters to provide cross-feature clustering (603). Automatic insight discovery (e.g. using a multi-level clustering algorithm) enables automatic classification labelling in accordance with cross-feature clusters. Classification can be based on modelled labels defining the respective classes (e.g. highway facing APs, border APs, etc.) and/or on automatic clustering with further optional discovery of the nature of the respective classes. The NI module further applies (604) to the given AP a class-based policy in accordance with the classification label associated with the given AP.

Figure 7A:
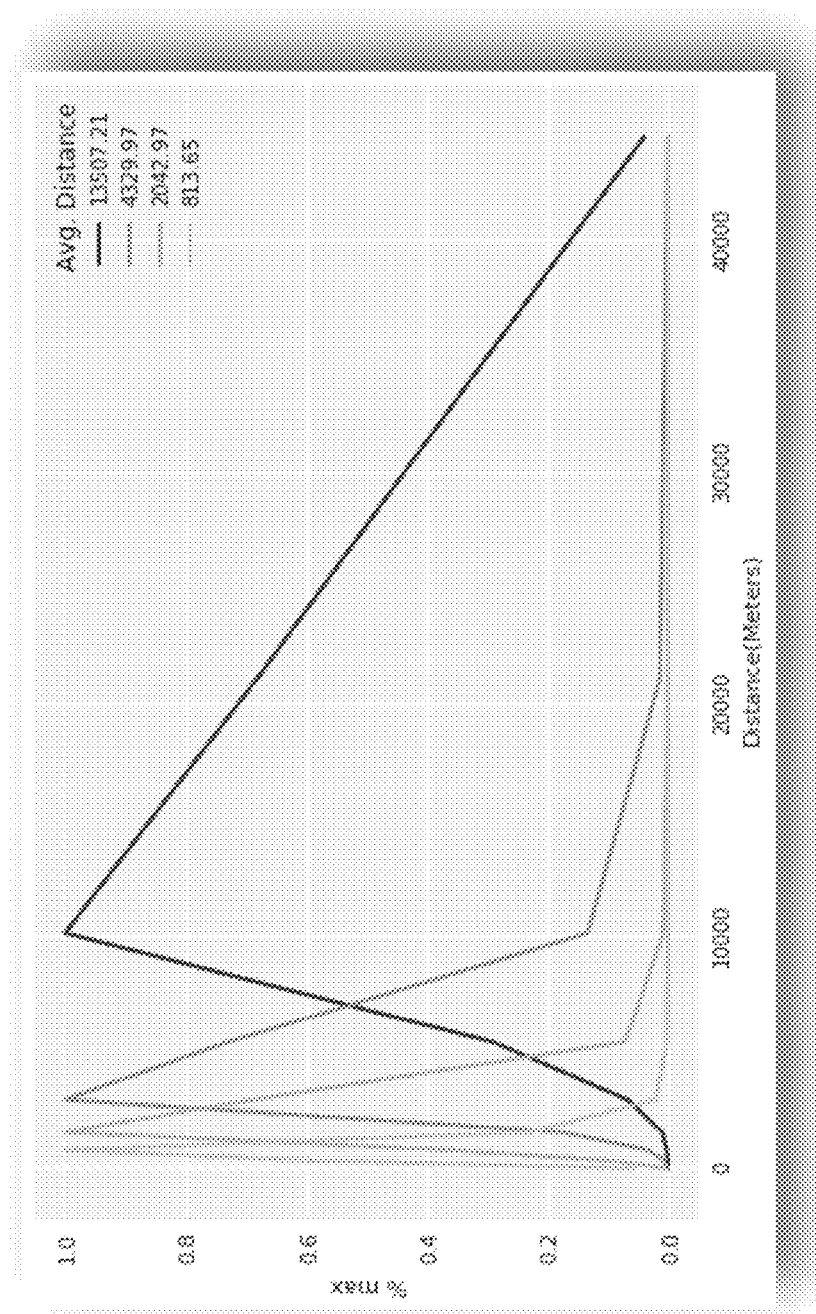
FIGS. 7a-7g illustrate non-limiting examples of feature clustering and AP classification labeling in accordance with certain embodiments of the presently disclosed subject matter.
Figure 7B:
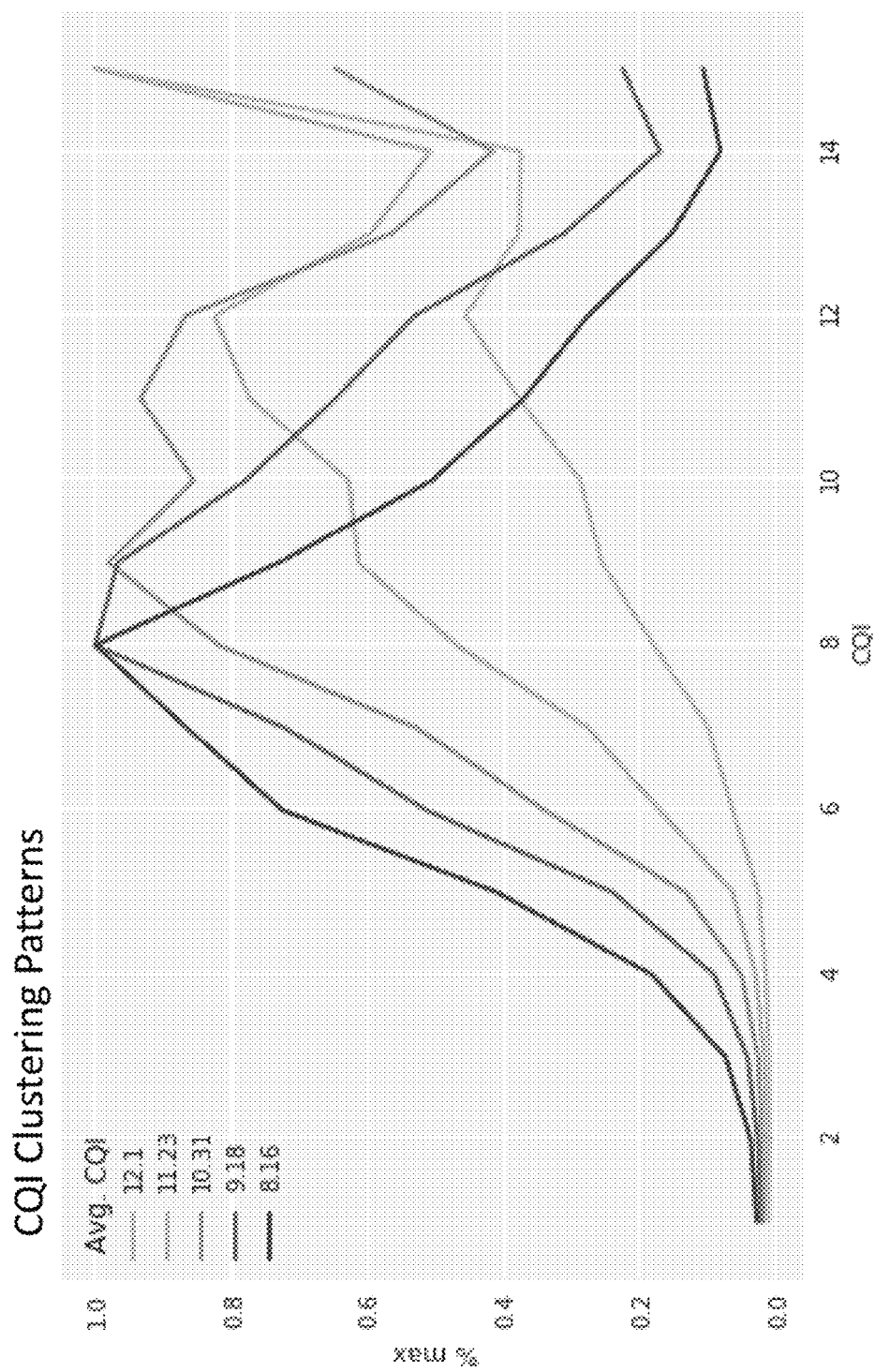
Figure 7C:
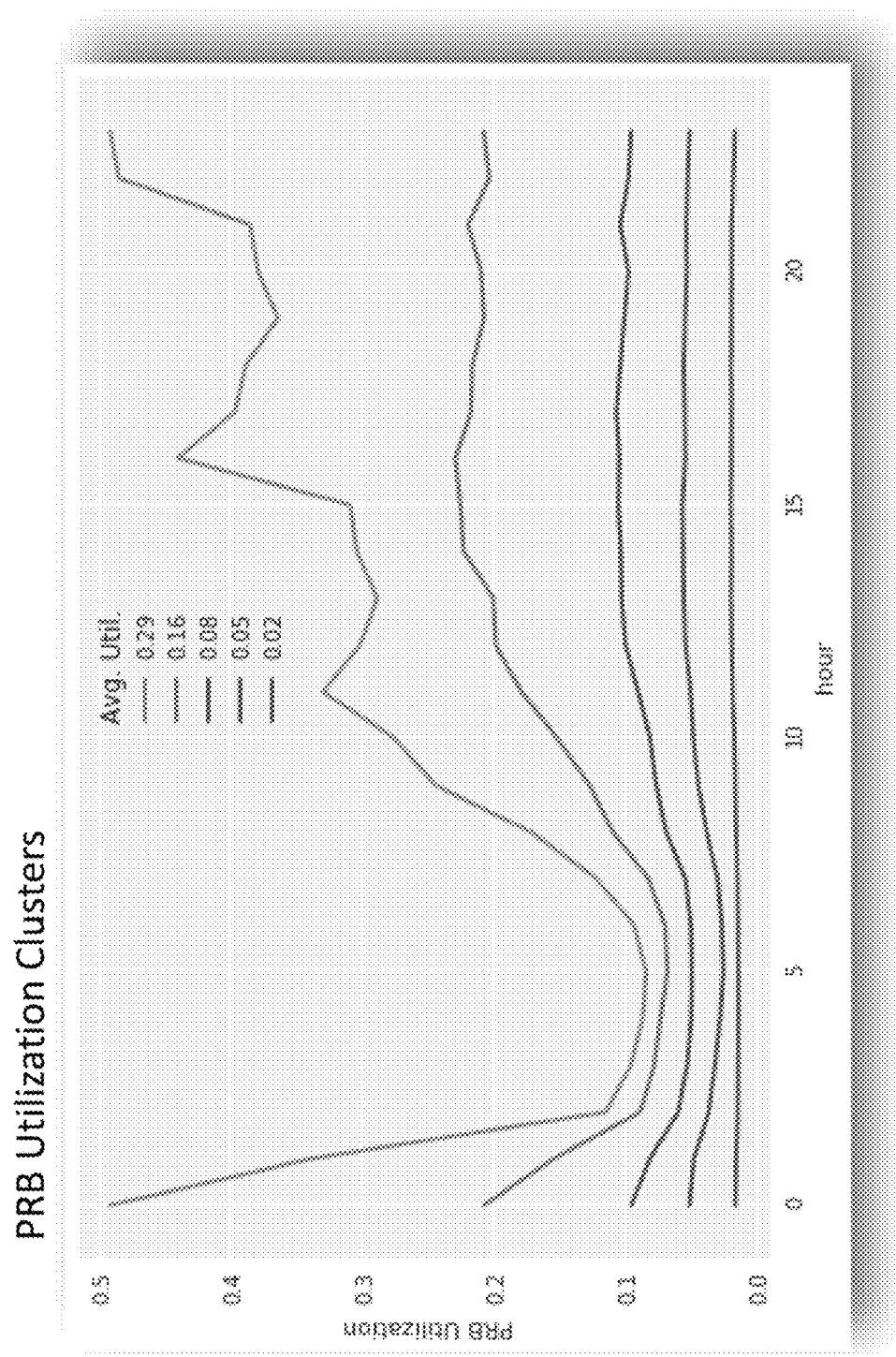
Figure 7D:
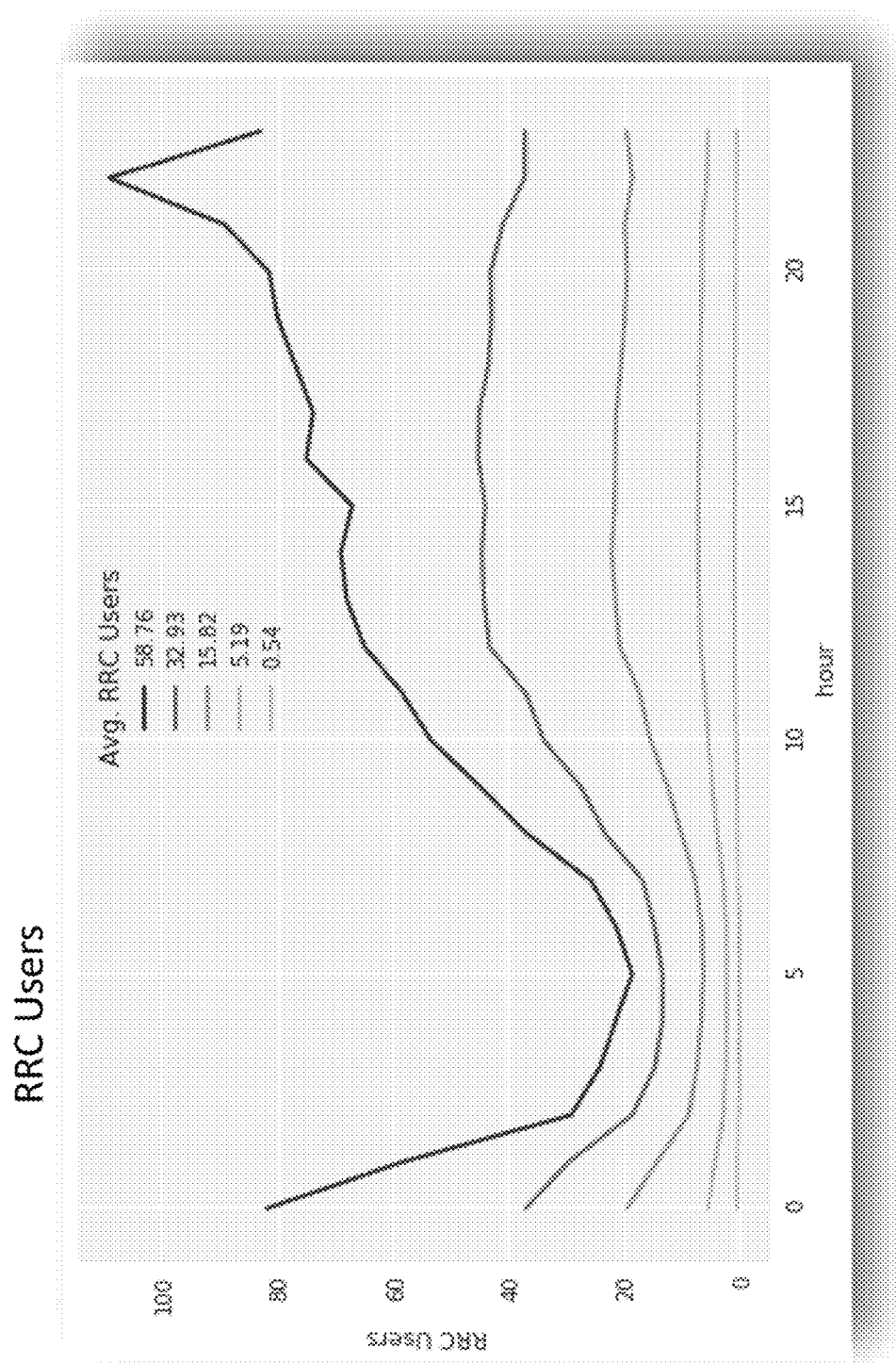
Figure 7E:
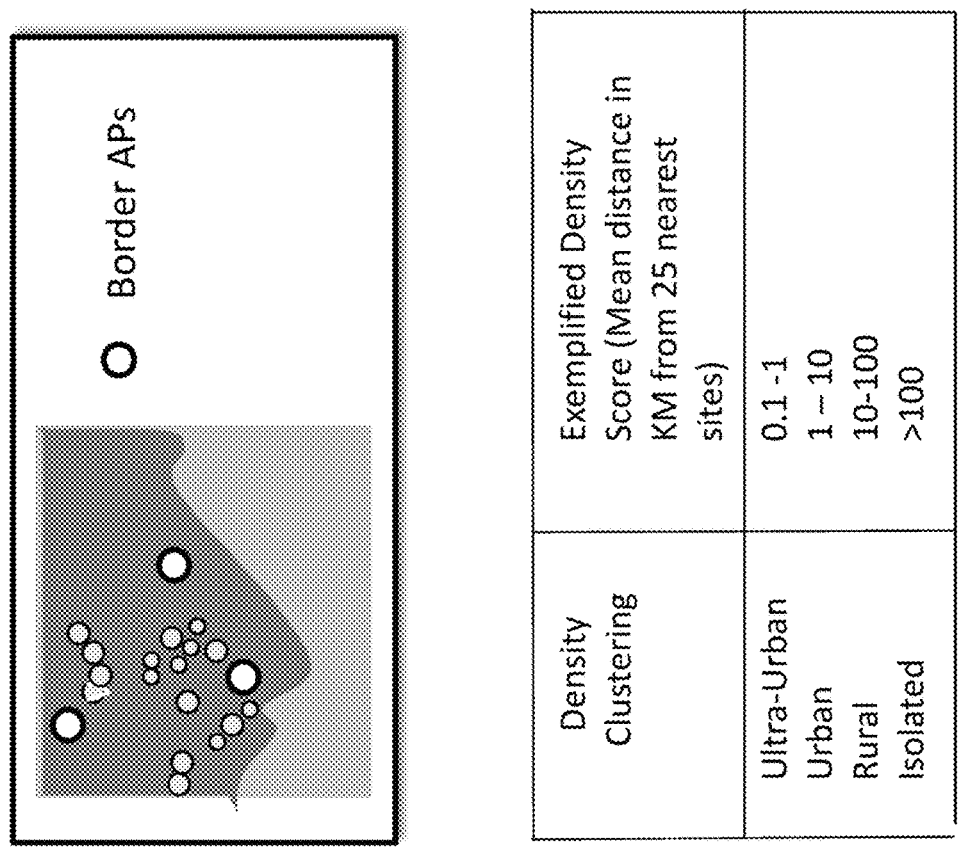
Figure 7F:
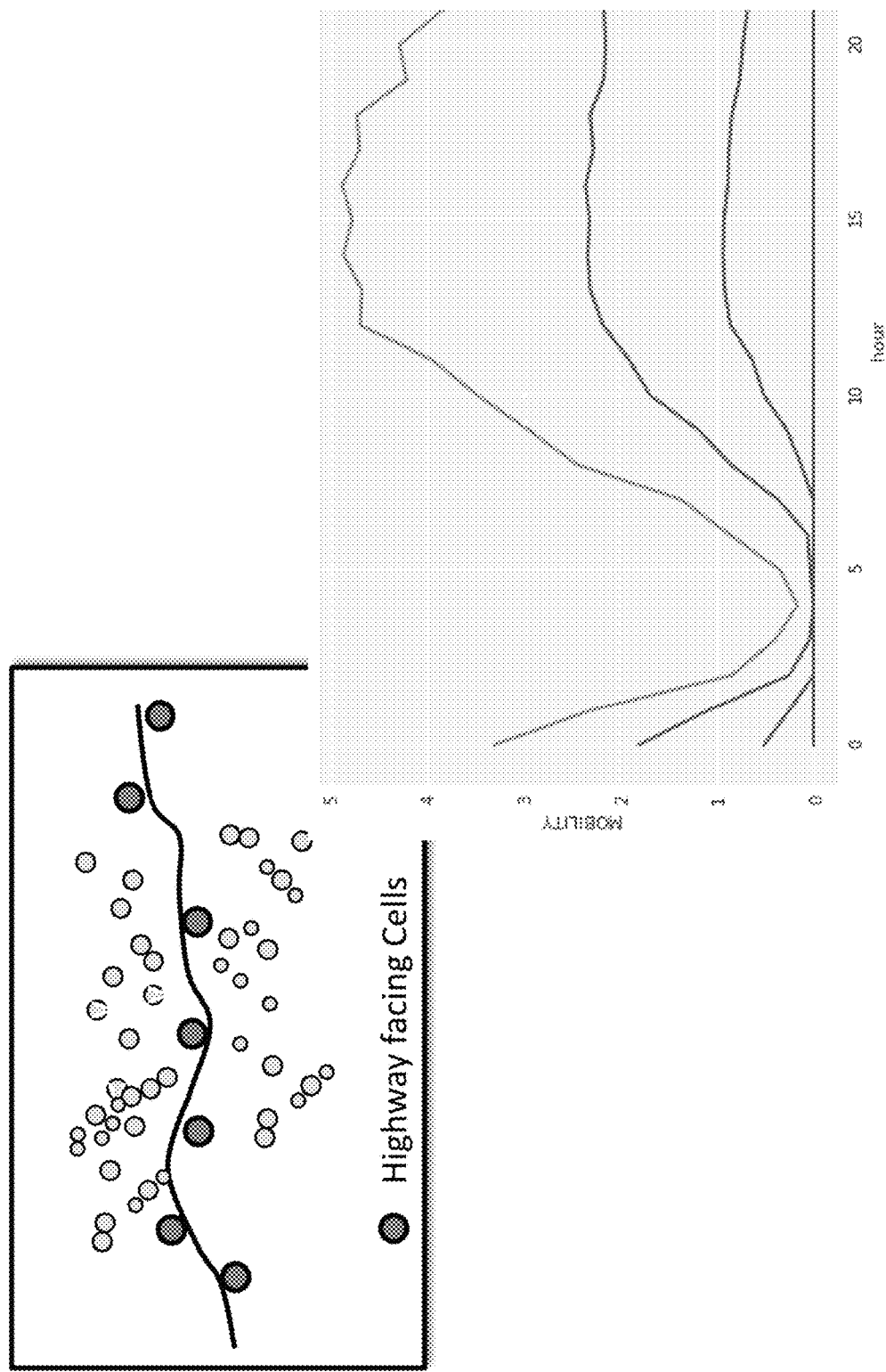
Figure 7G:
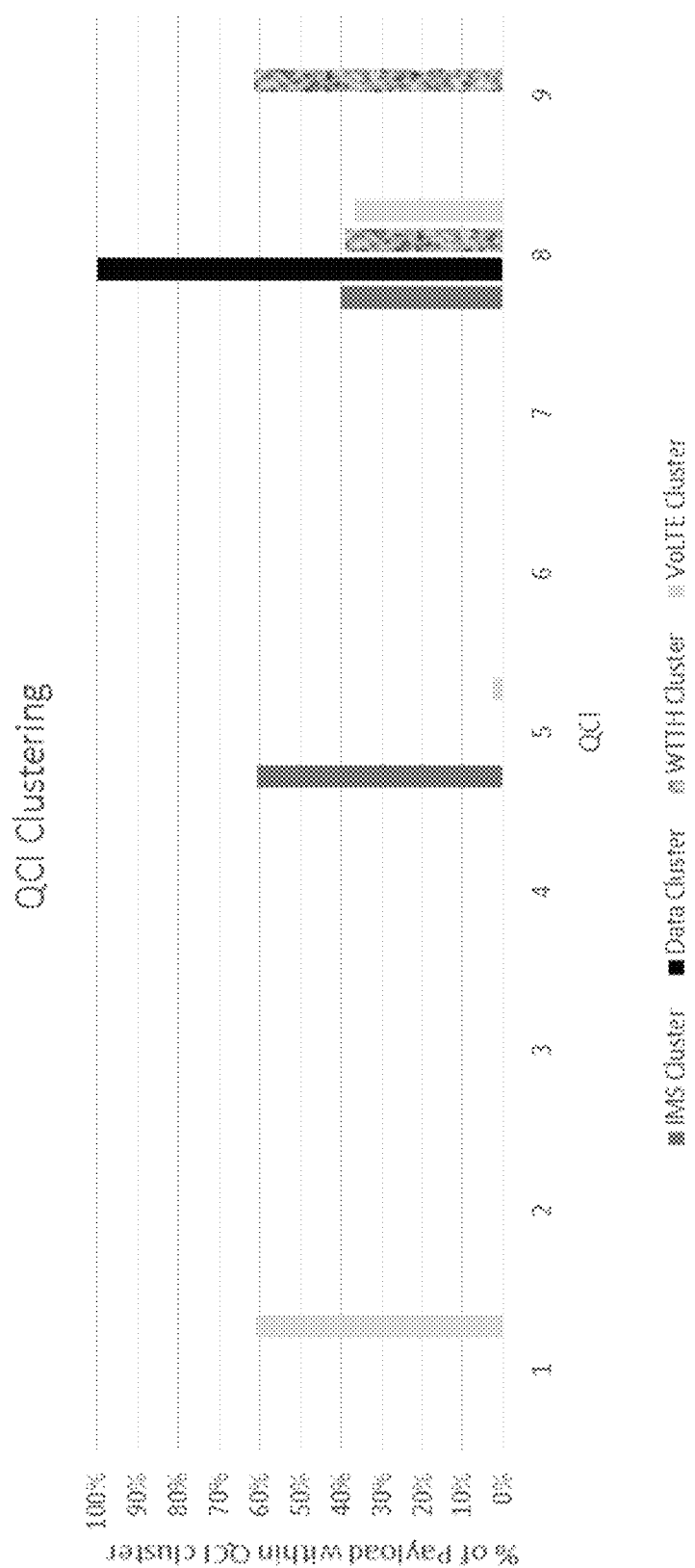

FIGS. 7a-7g illustrate non-limiting examples of feature clustering and AP classification labeling by applying the above detailed technique to field-obtained input data. Such field-obtained input data were received from more than 85 counters. FIG. 7a illustrates four significant AP cluster groups based on clustering of TA (time advance) histograms. FIG. 7b illustrates 5 significant AP cluster groups based on clustering of CQI (Channel Quality Indicator) levels. FIG. 7c illustrates 5 significant AP cluster groups based on clustering of PRB (Physical Resource Block) utilization over time. FIG. 7d illustrates 5 significant AP cluster groups based on clustering of RRC (Radio Resource Control) users over time, the illustrated clusters correlate with the PRB clusters illustrated in FIG. 7c. FIG. 7e illustrates automatic classification labelling of border APs (generally requiring special Border Cell Power Policy, Path Loss Compensation Policy, etc.) in accordance with cross-clustering of density and TA. FIG. 7f illustrates automatic classification labelling highway facing cells in accordance with cross-clustering of total mobility (number of incoming and outgoing users), density and RRC users. FIG. 7g illustrates automatic QCI (QoS Class Identifier) classification labelling per main provided service (VoLTE APs; Data APs; WTTH APs; IMS APs).

It is to be understood that the presently disclosed subject matter is not limited in its application to the details set forth in the description contained herein or illustrated in the drawings. The presently disclosed subject matter is capable of other embodiments and of being practiced and carried out in various ways.

It will also be understood that the presently disclosed subject matter further contemplates a non-transitory machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of controlling traffic in a wireless network, the method comprising:
  using, by a processing system comprising at least one processor and at least one memory, a machine learning (ML) model for classification of one or more access points (APs) in the wireless network in accordance with a first part of AP metrics to generate a plurality of classes, each comprising peering APs;
  identifying, by the processing system, one or more first APs with negative performance variations above a first variation threshold, the first variation threshold defined as a predefined percentage of a mean value of one or more AP performance metrics of all peering APs classified to a given class, and identifying one or more second APs with positive performance variations above a second variation threshold; and
  enabling, by the processing system, one or more corrective actions with regard to the one or more first APs, the one or more corrective actions including aligning a configuration corresponding to a subset of the peering APs with a configuration corresponding to the one or more second APs.

2. The method of claim 1, wherein the AP performance metrics do not belong to the first part of AP metrics.

3. The method of claim 1, further comprising identifying, by the processing system, class-based AP performance metrics of the given class in accordance with AP performance metrics of the peering APs classified, and identifying the one or more corrective actions in accordance with the class-based AP performance metrics.

4. The method of claim 1, wherein the identifying and the enabling are provided continuously.

5. The method of claim 4, wherein the using is provided continuously.

6. The method of claim 1, further comprising identifying, by the processing system, a class-based configuration of the given class, the class-based configuration corresponding to the peering APs, the one or more corrective actions including aligning a configuration of the one or more first APs with the class-based configuration.

7. The method of claim 6 further comprising:
  optimizing the class-based configuration in accordance with the configuration corresponding to the one or more second APs.

8. The method of claim 1, wherein the ML model is a deep neural network trained to classify APs using at least part of the AP metrics thereof.

9. The method of claim 1, wherein the one or more corrective actions include a configuration update.

10. The method of claim 1, wherein the negative performance variations to be identified and AP performance metrics usable therefor are customized for each given class.

11. A method of controlling traffic in a wireless network, the method comprising:
  using, by a processing system, comprising at least one processor and at least one memory, a machine learning (ML) model for classification of one or more access points (APs) in the wireless network belonging to a given class to generate a plurality of peering APs;
  identifying, by the processing system, a class-based configuration in accordance with AP metrics of APs classified to the given class, the class-based configuration comprising a mean configuration of the plurality of peering APs, the mean configuration defining a first variation threshold corresponding to a predefined percentage of a mean value of one or more AP performance metrics of all peering APs classified to a given class, and identifying one or more APs with positive performance variations above a second variation threshold; and
  enabling, by the processing system, applying the class-based configuration to the plurality of peering APs, the class-based configuration including aligning configurations of a subset of the peering APs with configurations corresponding to the one or more APs.

12. A processing system to control traffic in a wireless network, the processing system comprising at least one processor and at least one memory configured to:
  use a machine learning (ML) model for classification of one or more access points (APs) in the wireless network in accordance with a first part of AP metrics to generate a plurality of classes, each comprising peering APs;
  process one or more first APs with negative performance variations above a first variation threshold, the first variation threshold defined as a predefined percentage of a mean value of one or more AP performance metrics of all peering APs classified to a given class, and process one or more second APs with positive performance variations above a second variation threshold; and
  enable one or more corrective actions with regard to the one or more first APs, the one or more corrective actions including aligning configurations of a subset of the peering APs with configurations corresponding to the one or more second APs.

13. The processing system of claim 12, wherein the AP performance metrics do not belong to the first part of AP metrics.

14. The processing system of claim 12, wherein the processing system is further configured to identify class-based AP performance metrics of the given class in accordance with AP performance metrics of the peering APs classified thereto, and identify the one or more corrective actions in accordance with the class-based AP performance metrics.

15. The processing system of claim 12, wherein the processing system is further configured to identify a class-based configuration of the given class, the class-based configuration corresponding to the peering APs, the one or more corrective actions including aligning a configuration of the one or more first APs with the class-based configuration.

16. The processing system of claim 15, wherein the processing system is further configured to:
optimize a class-based configuration in accordance with a configuration corresponding to the one or more second APs.

17. The processing system of claim 12, wherein the negative performance variations to be processed and AP performance metrics usable therefor are customized for each given class.

18. A non-transitory computer readable medium usable by a processing system to control traffic in a wireless network, the non-transitory computer readable medium comprising instructions that, when executed by at least one processor and at least one memory of the processing system, cause the processing system to perform operations comprising:
using a machine learning (ML) model for classification of one or more access points (APs) in the wireless network in accordance with a first part of AP metrics to generate a plurality of classes, each comprising peering APs;
processing one or more first APs with negative performance variations above a first variation threshold, the first variation threshold defined as a predefined percentage of a mean value of one or more AP performance metrics of all peering APs classified to a given class, and processing one or more second APs with positive performance variations above a second variation threshold; and
enabling one or more corrective actions with regard to the one or more first APs, the one or more corrective actions including aligning configurations of a subset of the peering APs with configurations corresponding to the one or more second APs.

19. The non-transitory computer readable medium of claim 18, wherein the ML model is a deep neural network trained to classify APs according to the AP metrics.

20. The non-transitory computer readable medium of claim 18, further comprising instructions for continuously updating the classification of the APs using real-time AP performance metrics.

* * * * *